United States Patent [19]

Chen

[11] Patent Number: 5,361,817

[45] Date of Patent: Nov. 8, 1994

[54] HEAT-DISSIPATING MEANS OF NEST TIRE STRUCTURE FOR A RUN-FLAT TIRE

[76] Inventor: Long-Hsiung Chen, c/o Hung Hsing Patent Service Center, P.O. Box 55-1670, Taipei (104), Taiwan, Prov. of China

[21] Appl. No.: 120,806

[22] Filed: Sep. 15, 1993

[51] Int. Cl.⁵ .................................. B60C 17/06
[52] U.S. Cl. .................... 152/520; 152/153; 152/158; 152/310; 152/521
[58] Field of Search ............... 152/153, 157, 158, 310, 152/513, 516, 520, 521, 501

[56] References Cited

U.S. PATENT DOCUMENTS

| | | | |
|---|---|---|---|
| 638,590 | 12/1899 | Munger | 152/158 |
| 1,049,678 | 1/1913 | Craig | 152/153 |
| 1,379,915 | 5/1921 | Guagliardo | 152/158 |
| 1,534,365 | 4/1925 | Dunn | 152/158 |
| 2,088,988 | 8/1937 | Antilotti | 152/153 |
| 2,119,735 | 6/1938 | Campbell | 152/153 |
| 4,212,338 | 7/1980 | Tiemann | 152/158 |

*Primary Examiner*—Michael W. Ball
*Assistant Examiner*—Francis J. Lorin

[57] ABSTRACT

A heat-dissipating valve is formed on a steel rim of a car tire which includes an inner tire secured in an outer tire, whereby upon puncture of the outer tire, the inner tire, when compressed between the outer tire and the steel rim as loaded by a car weight, may release hot air outwardly through the heat-dissipating valve for dissipating frictional heat outwardly as produced by the friction between the inner tire and the steel rim or outer tire to prevent a fire accident.

5 Claims, 3 Drawing Sheets

HEAT-DISSIPATING MEANS OF NEST TIRE STRUCTURE FOR A RUN-FLAT TIRE

BACKGROUND OF THE INVENTION

U.S. patent application Ser. No. 07/911,345 filed on Jul. 8, 1992 now U.S. Pat. No. 5,271,444 invented by the same inventor of this application, discloses a nest tire structure having a solid inner tire secured in an outer tire, whereby upon a breaking or leaking of the outer tire, the solid inner tire will be received by an inner-tire seat formed on a steel rim secured with the outer tire to prevent a sudden collapse of a car due to a run-flat tire.

Upon puncture of a broken tire, the tire will become flat to couple the solid inner tire 30 with the inner-tire seat 201, and heat will be produced due to friction between the solid inner tire 30 and the seat 201 of the steel rim 20 under rotation of the run-flat tire of a car wheel, to possibly cause fire accident or even injury to the car driver or passengers.

SUMMARY OF THE INVENTION

The object of the present invention is to provide at least a heat-dissipating valve on a steel rim of a car tire having an inner tire secured in an outer tire, whereby upon puncture of the outer tire, the inner tire, when compressed between the outer tire and the steel rim as loaded by a car weight, may release hot air outwardly through the heat-dissipating valve for dissipating frictional heat outwardly as produced by the friction between the inner tire and the steel rim or outer tire to prevent a fire accident by the frictional heat for ensuring a tire safety even broken.

DETAILED DESCRIPTION

Figure 6:
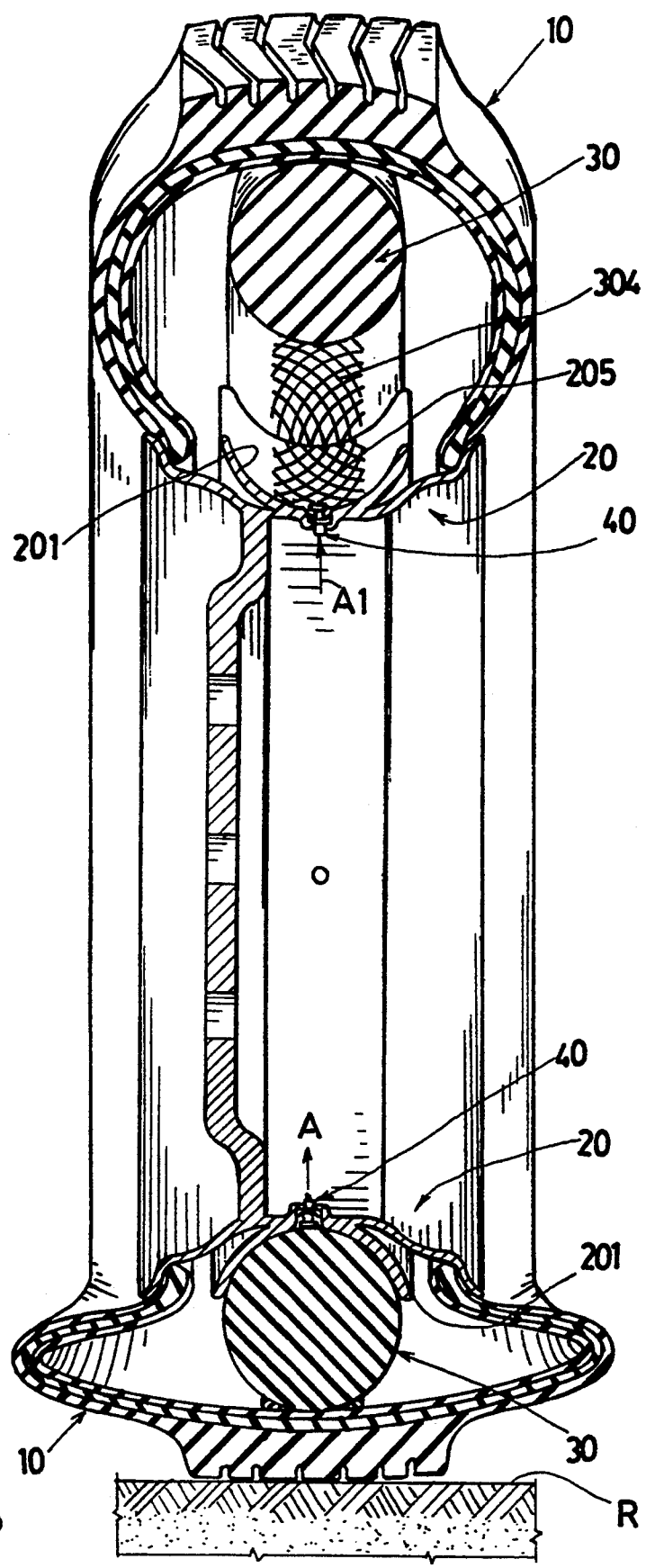
FIG. 6 is a sectional drawing of the present invention when used in a complete set of tire.

As shown in the drawing figures, the present invention comprises: an outer tire 10 having an inner surface 101 for fixedly securing a solid inner tire 30 on the inner surface 101 and a tire tread 103 formed on an outer surface of the outer tire 10; a steel rim 20 having a curved inner-tire seat 201 formed on an outer surface of the steel rim 20 within two opposite rim edges 202 of the rim 20 with each rim edge 201 engageable with each tire head 102 of the outer tire 10, and a corrugated rim surface 205 formed on a concave surface of the inner-tire seat 201 having corrugated grooves recessed in the concave surface of the inner-tire seat 201 facing the solid inner tire 30; the solid inner tire 30 having a tread-side peripheral portion 301 adjacent to the tire tread 103 of the outer tire 10 secured to the inner surface 101 of the outer tire 10 by adhesive 302 or by integral forming process (not shown), a rim-side peripheral portion 303 opposite to the tread-side peripheral portion 301 having a corrugated tire surface 304 formed on the rim-side peripheral portion 304 facing the curved inner-tire seat 201 of the steel rim 20; and at least a heat-dissipating valve 40 formed on the steel rim 20. Preferably, there may be provided at least a pair of the heat-dissipating valves 40 symmetrically on the rim 20 as shown in FIG. 6.

Each heat-dissipating valve 40 includes: a retainer portion 41 made of elastomer material fixed in a retainer socket 203 recessed in an outer surface of the steel rim 20 in a central portion of the curved inner-tire seat 201, a nipple portion 42 made of elastomer material or rubber protruding inwardly from the retainer portion 41 through a nipple hole 204 formed in the rim 20, a depression member 45 secured on an outer portion of a stem 43 made of elastomer material secured to the retainer portion 42 having a needle tunnel 44 longitudinally formed through the depression member 45, the stem 43 and the nipple portion 42 about a longitudinal axis 40a of the valve 40, a rigid hollow needle 46 preferably made of metal or steel material having a needle through hole 48 formed through the needle 46, and a plurality of hooked prongs 47 formed on a circumferential surface of the hollow needle 46 for firmly and stably engaging the needle 46 in the needle tunnel 44 in the valve 40. The hollow needle 46 has an acute needle tip portion 461 formed on an innermost end of the needle 46 normally resting on an end portion 441 of the needle tunnel 44, whereby upon a squeezing on the depression member 45 by the solid inner tire 30 as loaded by a car weight when a car tire is punctured or broken, the needle 46 will be pressurized to protrude inwardly to allow the needle tip portion 461 to break the nipple portion 42, thereby releasing air A outwardly (FIGS. 2, 4 and 6) to carry hot air outwardly due to frictional heat produced between the seat 201 and the inner tire 30 and prevent a fire accident occuring on the tire when run flat due to a puncture or breakage of the car tire.

Other designs or modifications may be made by those skilled in the art without departing from the spirit and scope of this invention.

Figure 1:
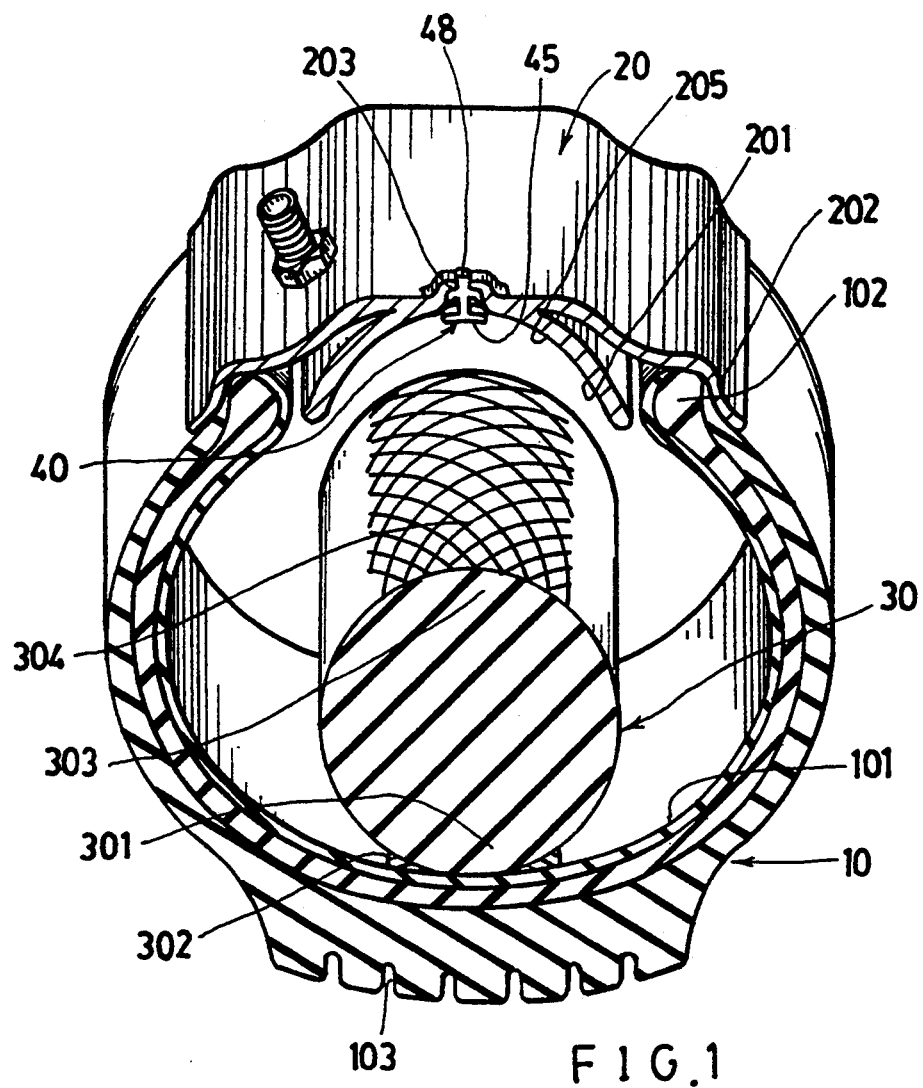
FIG. 1 is a partial cut-away illustration of the present invention.
Figure 2:
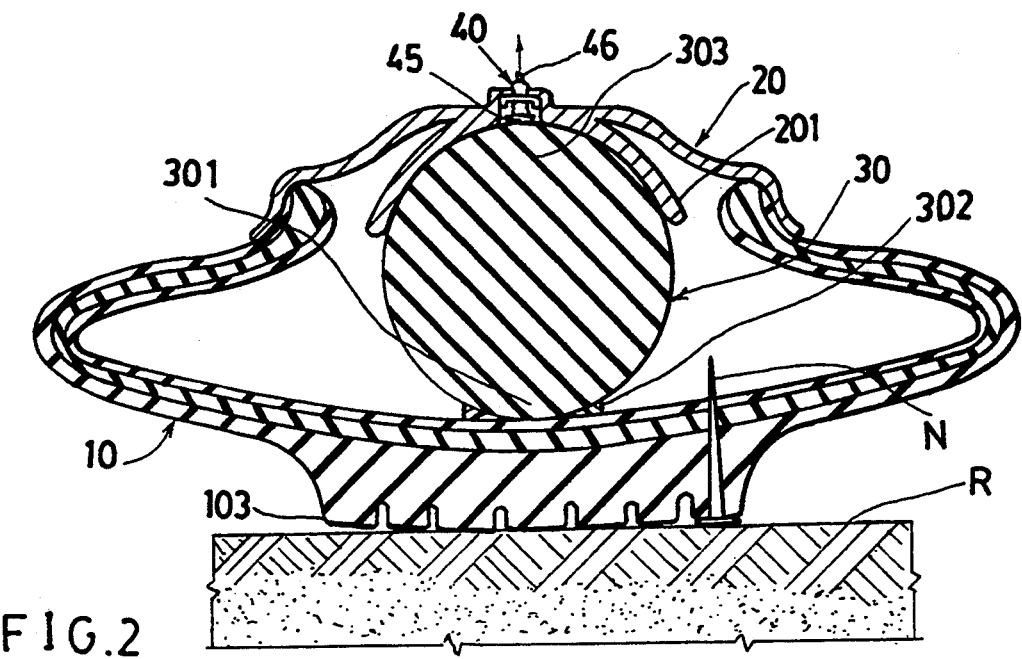
FIG. 2 is an illustration of the present invention showing a run-flat tire.
Figure 3:
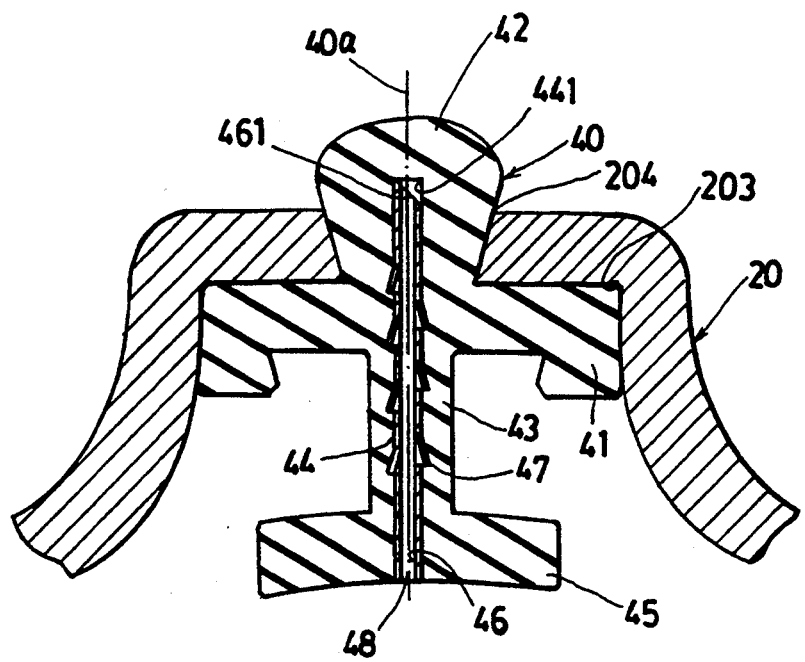
FIG. 3 is a sectional drawing of the present invention.
Figure 4:
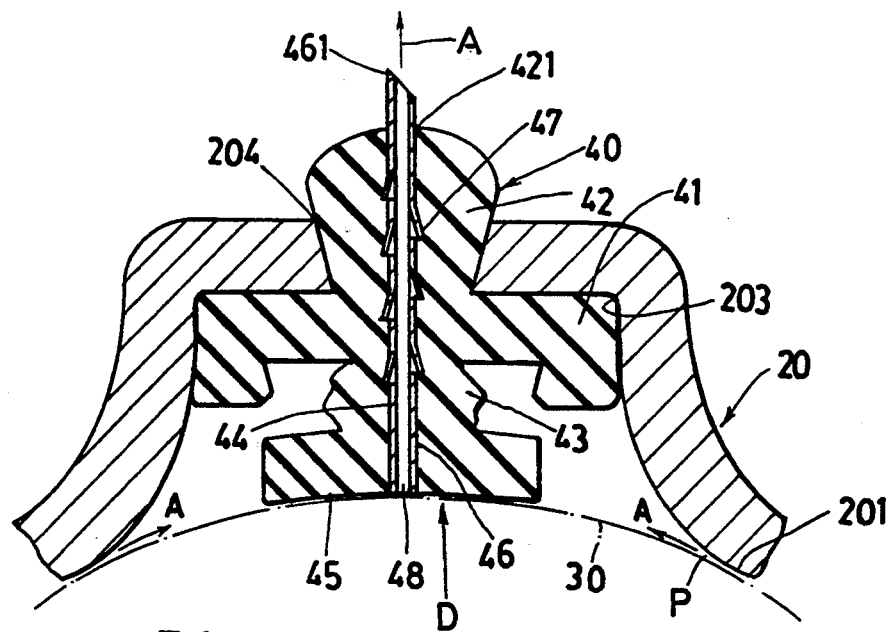
FIG. 4 shows a heat-dissipating valve of the present invention for releasing hot air outwardly.
Figure 5:
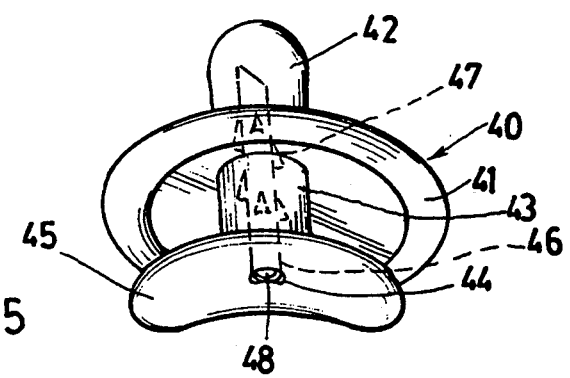
FIG. 5 is a perspective view of the present invention.

When a car tire is punctured such as stuck by a nail N to leak compressed air from the tire, the tire will run flat as shown in FIG. 2 to allow the inner-tire seat 201 to receive the solid inner tire 30 as loaded by a car weight on a road surface R, however a friction between the inner tire 30 and the inner-tire seat 201 will occur to produce frictional heat, thereby possibly causing fire accident for the tire and the car. Nevertheless, during the "compression step" as shown in FIG. 2 or lower section of FIG. 6, an air (hot air) stream will be released (A) through the needle through hole 48 since the depression member 45 will also be depressed inwardly ("D" as shown in FIG. 4 from FIG. 3) to urge the needle 46 to stick and break through the nipple portion 42 to form an air passage through the needle through hole 48 communicating the interior within the outer tire 10 for releasing hot air stream passing through an aperture (P) between the inner tire 30 and the seat 201 as shown in FIG. 4 to carry and remove frictional heat produced between the seat 201 and the inner tire 30 due to heat-exchange effect, thereby dissipating heat caused in the tire and preventing tire accident for safety purpose.

As shown in FIG. 6, the lower section of the tire structure shows a compressed tire as loaded by a car weight to engage the seat 201 with the inner tire 30 for releasing air (A) and dissipating heat outwardly through the valve 40, while the upper portion of the tire may be restored to suck environmental "cool" air inwardly (A1) through the valve 40, thereby cooling down the inner tire 30 and the seat 201 for further cooling purpose for the safety of the car running.

I claim:

1. A nest tire structure comprising:
   an outer tire having two tire beads of said outer tire secured to two opposite rim edges of a steel rim;
   a solid inner tire fixedly secured to an inner surface of said outer tire;
   said steel rim having a curved inner-tire seat formed on an outer surface of said steel rim for receiving said solid inner tire when said outer tire is punctured to run flat; and
   at least one heat-dissipating valve formed in said inner-tire seat of said steel rim operatively opened for releasing a hot air stream from the inside of the tire outwardly through an aperture located between said inner-tire seat and said inner tire when said inner tire is received in said seat and thereby urges the heat-dissipating valve to open.

2. A nest tire structure according to claim 1, wherein each said heat-dissipating valve includes: a retainer portion made of elastomer material fixed in a retainer socket recessed in an outer surface of the steel rim in a central portion of the curved inner-tire seat, a nipple portion made of elastomer material protruding inwardly from the retainer portion through a nipple hole formed in the steel rim, a depression member secured on an outer portion of a stem made of elastomer material secured to the retainer portion having a needle tunnel longitudinally formed through the depression member, the stem and the nipple portion about a longitudinal axis of the heat-dissipating valve, and a rigid hollow needle having a needle through hole formed through the needle, whereby upon a squeezing on the depression member by the solid inner tire as loaded by a car weight when a car tire is punctured or broken, the needle will be forced to protrude radially inwardly relative to the axis of the tire to allow a needle tip portion to break the nipple portion, thereby releasing air outwardly to carry hot air outwardly due to frictional heat produced between the inner-valve seat and the inner tire and thereby prevent a fire accident.

3. A nest tire structure according to claim 2, wherein said hollow needle has a plurality of hooked prongs formed on a circumferential surface of the hollow needle for firmly engaging the needle in the heat-dissipating valve.

4. A nest tire structure according to claim 2, wherein said hollow needle has an acute needle tip portion formed on a radially innermost end of the needle normally resting on a radially innermost end portion of the needle tunnel in the valve.

5. A nest tire structure according to claim 2, wherein said curved inner-tire seat and said solid inner tire are each formed with corrugated surfaces, said corrugated surfaces facing toward each other, whereby upon engagement of said inner-tire seat with said inner tire, the corrugated surfaces of said inner tire and said inner tire seat will be stably frictionally coupled with each other.

* * * * *